June 17, 1969 L. L. LOWE ET AL 3,449,818
SUPERCONDUCTOR JOINT
Filed May 16, 1967
FIG. 1
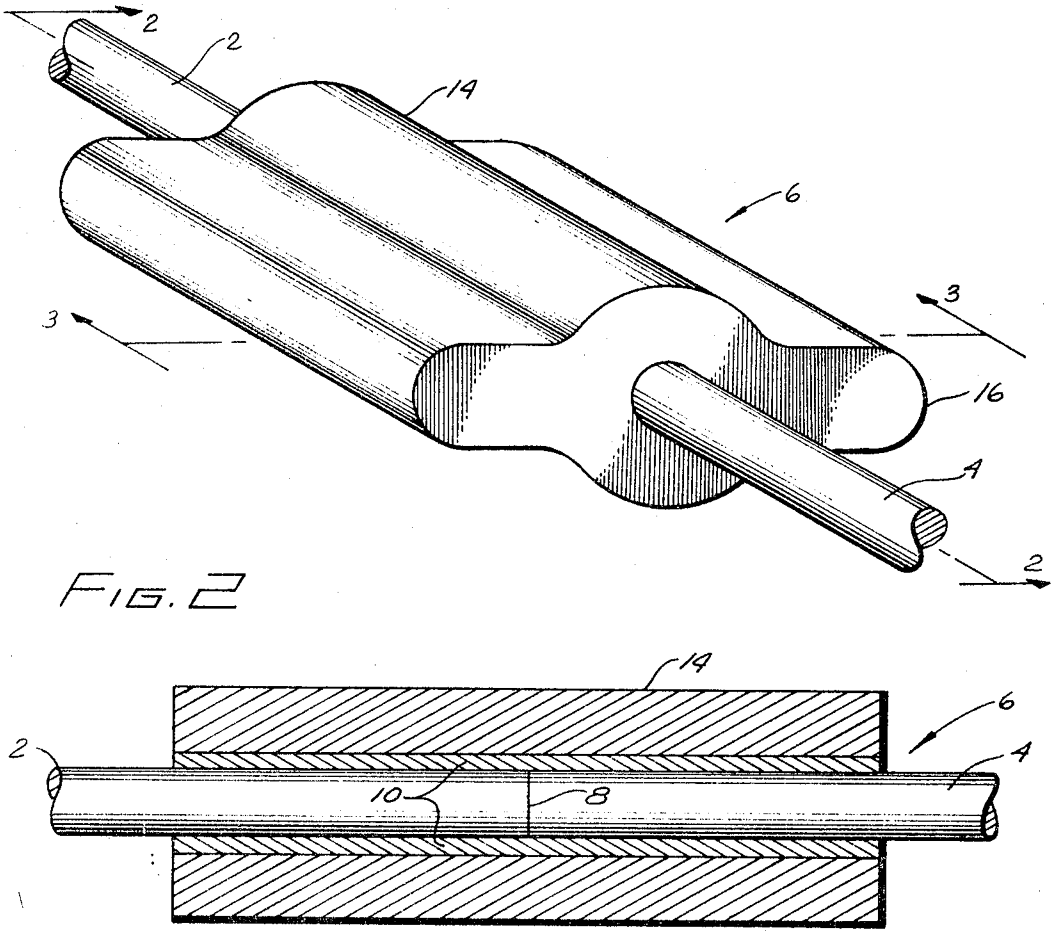
FIG. 1, FIG. 2
FIG. 3
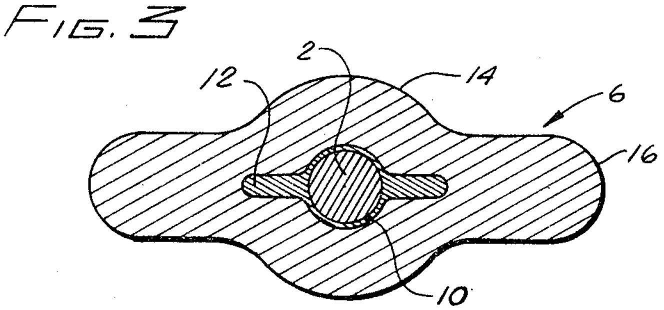
INVENTORS.
LARRY L. LOWE
GORDON G. CHASE
BY Gerald K. Kais
ATTORNEY 3,449,818

SUPERCONDUCTOR JOINT

Larry L. Lowe, Canoga Park, Calif., and Gordon G. Chase, Nederland, Colo., assignors to North American Rockwell Corporation, a corporation of Delaware Filed May 16, 1967, Ser. No. 638,860
Int. Cl. B23k *31/02*
U.S. Cl. 29—470.5 4 Claims

ABSTRACT OF THE DISCLOSURE

A superconductor joint and method of making. The ends of two superconductor wires are tinned with a Bi-Pb-Sn base superconductive alloy and brought into contact inside a superconductive sleeve. The assembly is hot pressed at a temperature above the yield point but below the melting point of the solder to deform the sheath about the wires and provide intimate contact therebetween.

BACKGROUND OF INVENTION

The present invention relates to a junction between two superconductor wires, and more particularly to an improved method of joining superconductors in such a manner that high supercurrents can thereafter be transported.

Superconductivity is the property of certain materials at cryogenic temperatures approaching absolute zero to carry currents without power dissipation. The factors affecting the current density at which a superconductive material ceases to function as such are the interrelation of magnetic field strength and temperature. The magnetic field strength, applied externally or generated by a current in the superconductor, limits superconducting critical transport current density at a given temperature T, T being less than the critical temperature $T_c$. $T_c$ is the highest temperature at which a material will superconduct. Similarly, at a given field strength, an increase in temperature and/or current density can terminate superconductivity. The supercurrent-carrying capacity of superconductors provides the basis for the fabrication of magnets which have little or no power loss. There are numerous applications for such magnets, for example, in high energy physics devices, lasers, bubble chambers, transformers, and long distance electrical transmission.

Superconductor devices display the tendency, for reasons not thoroughly understood but believed to include application of excessive current or by local heating, to undergo a transition from the superconductive state to a normally conductive state, after which the superconductive condition can be reestablished. This transition, which is called a superconducting/normal or SN transition, causes large induced voltage drops across the superconducting magnet when the strong fields collapse. Such voltage bursts may damage superconductor solenoids in addition to rendering them inoperative for short periods or permanently.

The tendency to undergo SN transitions is particularly pronounced at junctions between superconductor wires because the metallurgical characteristics of materials at the interface are affected by the joining method utilized. As is known, superconducting properties of a given alloy are influenced by the metallurgical history and properties of the material. Joining ends of superconductor wires by such means as welding, therefore, alters the metallurgical condition from the optimum. Nonetheless, junctions between strands of superconductor wires are frequently necessary for many reasons. For example, there are certain practical limitations on the length of superconductor wire which can be drawn in one section. Swaging machines are limited in the weight of a billet which can be handled, and as larger cross section superconductor wires are drawn, the lineal length of a wire produced from a given billet charge is reduced. The cost of producing superconductor wire also increases proportionately with an increase in unbroken length. Further, breakages in production of wire or assembly of solenoids running to many thousands of feet in length are bound to occur, particularly in view of the often brittle nature of superconductor wire. The inherently brittle nature of wires of such known superconductors as titanium-niobium, niobium-zirconium, and the like, may be aggravated by metallurgical processing such as cold working and heat treatments designed to enhance their superconductive properties.

Various methods have been utilized to make joints between superconductor wires. For example, pressure-type connections are made with clamping screws on terminal strips, outside a superconductor solenoid but still within a liquid helium bath. Since such joints are nonsuperconductive, means must be found for dissipation of the energy released, and persistent currents (i.e., continuous current flow with no degradation or voltage drop, not requiring further current input) are not realizable. Superconductor joints have been made utilizing solders such as copper-brass, tin-silver, and indium. Pressure joints have also been made between sections of superconductor wire with and without the use of sleeves over the joint section. Such prior art methods of making connections are not entirely satisfactory and the junctions display a high statistical frequency of SN transitions. An SN transition at a given point tends to be propagated throughout a solenoid, changing it from superconducting to nonsuperconducting. Because of the large voltages generated by such transitions, time must be allowed for the solenoid to recover by dissipating heat and returning to below the critical temperature. In view of these considerations, the development of a satisfactory and reliable superconductor joint has received considerable attention.

The main object of the present invention, therefore, is to provide an improved superconductor joint and method of making the same.

Another object is to provide a relatively rapid and reliable method of joining superconductors so that high supercurrents may be transported.

Another object is to provide such a junction which will not display any greater tendency to undergo SN transitions than the parent conductor.

Other objects and advantages of the present invention will become apparent from the following detailed description and appended claims.

BRIEF DESCRIPTION OF DRAWINGS

FIG. 1 is a perspective view of a superconductor joint made by the practice of the present invention.

FIG. 2 is a longitudinal section therethrough; and

FIG. 3 is a cross-sectional view.

SUMMARY OF INVENTION

In accordance with the present invention the ends of two superconductor wires are coated with a low-melting point superconductive alloy. The conductor ends are placed inside a ductile metal sheath or sleeve, which is preferably of superconductor material. The assembly is pressed with enough force to secure the superconductors in the sleeve and then is heated above the yield point but below the liquid point of the low melting alloy and further pressed to deform the sheath around the conductors. The result is a layer of cast superconductive solder around each superconductor inside a superconductor sleeve. The solder superconducts the current between the two high current conductors and between the conductors and the sleeve.

DESCRIPTION OF PREFERRED EMBODIMENTS

The solder which is utilized in the present invention is itself superconductive and should have a yield temperature below about 250° F., so that yield occurs during the pressing step at a temperature below one which would affect the metallurgical characteristics of the superconductor wires. The elements in Groups IV and V of the Periodic Table are those which display superconductivity and the principal solder constituents should be chosen from this group. In particular, it is found that a bismuth-lead-tin base superconductive alloy meets the requirements of superconductivity and low-melting range. The following Table I gives the general composition ranges for such alloys, Table II an especially satisfactory composition range, and Table III presents examples of specific such alloys, together with their yield temperature and melting range. All compositions are given in terms of weight percent and temperatures in ° F.

Table I

Bi—About 40–50%
Pb—About 20–40%
Sn—About 10–15%
Cd—Up to about 10%
In—Up to about 18%
Sb—Up to about 10%
Balance trace impurities Table II Bi—About 42–48%
Pb—About 22–30%
Sn—About 11–14%
Cd—About 5–10%
In—Up to 16%
Sb—Up to 9%
Balance trace impurities embodiment shown is of such shape that sleeve 6 is deformed into a configuration with a central raised section 14 of generally circular cross-section and with flattened, flange-like lateral portions 16. The required pressure will vary with the materials utilized, their physical dimensions and the like. As a general matter, a pressure slightly higher than the yield strength of the sleeve is satisfactory. The sleeve is also concurrently or sequentially heated to a temperature above the solder's yield point but below its melting point, thereby to achieve flow and excellent contacting of the solder with the ends of the superconductor wires and between the superconductor wires and the sleeve.

The following example is offered to illustrate the present invention in greater detail.

EXAMPLE

Ti–35 w/o Nb wires, 0.10 in. diameter, were coated with a superconductive alloy consisting essentially of (by weight percent) 48 Bi, 25.63 Pb, 12.77 Sn, 9.60 Cd, and 4.0 In. The coated wires were butted end-to-end inside a ¾ in. long, 0.10 in. diameter niobium sheath with 0.030" wall thickness. This assembly was pressed between two die blocks at a temperature of 65° C. with enough force to secure the conductors in the sheath. The joint and die block were then heated above the yield point of the alloy at 147° F., and then further pressed with enough force to deform the sheath around the conductors. Following this, the assembly was cooled to below the melting point of the solder, and the joint removed from the die blocks.

The resulting superconductor solder joint conducted 352 amps, or 65% of the maximum theoretical current. For comparison purposes, a pressed joint made in the same manner, except with the solder omitted, superconducted 256 amps. The alloy itself in the cast stage superconducts $8\times10^3$ amps/cm.$^2$.

The foregoing example is illustrative of the scope of the present invention, but should not be construed as limitative thereof for variations within its scope will be apparent to those skilled in the art. The invention should be understood to be limited only as is indicated by the following claims.

TABLE III

| Alloy | Bi (percent) | Pb (percent) | Sn (percent) | Cd (percent) | In (percent) | Sb (percent) | Yield temperature (deg.) | Melting (deg.) |
|---|---|---|---|---|---|---|---|---|
| A | 44.7 | 22.6 | 11.3 | 5.3 | 16.0 | | 117 | 117–126 |
| B | 47.5 | 25.4 | 12.6 | 9.5 | 5.0 | | 140 | 134–149 |
| C | 48 | 25.63 | 12.77 | 9.60 | 4.0 | | 147 | 142–149 |
| D | 42.50 | 37.70 | 11.30 | 8.50 | | | 165 | 160–190 |
| E | 48 | 28.50 | 14.50 | | | 9.00 | 241 | 217–440 |

A description of the manner in which the present joint is made now follows with reference to the drawings. FIG. 1 shows two superconductor wires 2 and 4 such as of niobium-titanium joined in a superconductor sleeve 6. The sleeve is itself preferably of a superconductor metal or alloy which has good ductility so that it may be readily deformed. Examples are niobium, niobium-zirconium, and niobium-titanium containing high amounts of niobium. In FIG. 2 is seen the two superconductor wires in abutment at point 8, enclosed by the superconductive solder 10 and sleeve 6. The wires may also be overlapping or twisted. The cross-section view in FIG. 3 reveals some radial extension 12 of the solder upon hot pressing. The sleeve is initially a right cylinder in form, about 0.250" to 0.375" long, 0.100" to 0.125" in diameter, depending on the diameter of the superconductor wires, and about 0.025" to 0.040" wall thickness. A gap of about .005" to .010" is initially provided between the sleeve and the wires.

In fabrication of the joint, the ends of superconductor wires are tinned with the solder to a thickness of about 0.020". The sleeve is then slipped over the ends which are brought into abutment and pressed with sufficient force to secure the assembly in position. The assembly is then pressed in a die with sufficient force to deform the sleeve into contact over its entire inner surface with the solder and to conform it to the shape of the die. The die in the

We claim:

1. A method of forming a superconductive joint between superconductor wires, which comprises:

(a) coating the ends of said wires with a superconductive solder consisting essentially of about, by weight percent, Bi—40–50%
Pb—20–40%
Sn—10–15%
Cd—Up to 10%
In—Up to 18%
Sb—Up to 10% and the balance trace impurities, (b) positioning a sleeve of a superconductive material over the coated wires, (c) bringing said ends into contact, and (d) pressing the resulting assembly at a suitable pressure and temperature above the yield point and below the melting point of the solder to deform the sleeve about the wires and provide intimate contact therebetween.

2. The method of claim 1 wherein said alloy consists essentially of about, by weight percent, Bi—42–48%
Pb—22–30%
Sn—11–14%
Cd—5–10%
In—Up to 16%
Sb—Up to 9% and the balance trace impurities.

3. The method of claim 1 wherein the superconductive wire is selected from the class consisting of niobium-zirconium and niobium-titanium alloys and the sleeve is selected from the class consisting of niobium, and niobium-zirconium and niobium-titanium alloys.

4. The method of claim 1 wherein the superconductive wire consists essentially of niobium-titanium alloy, said sleeve is of niobium and said solder consists essentially of about, by weight percent, 48 Bi, 25.6 Pb, 27.8 Sn, 9.6 Cd, 4.0 In, and the remainder trace impurities, and the assembly is heated at a temperature of about 147° F.

References Cited

UNITED STATES PATENTS

| | | | |
|---|---|---|---|
| 1,982,645 | 12/1934 | Derby | 75—134.3 |
| 1,988,010 | 1/1935 | Kratz | 75—134.3 |
| 2,283,263 | 5/1942 | Kates | 75—134.3 |
| 2,769,335 | 11/1956 | Moenning et al. | 75—134.3 X |
| 3,100,330 | 8/1963 | Rice et al. | 29—470.5 X |
| 3,184,303 | 5/1965 | Grobin | 29—599 X |
| 3,309,457 | 3/1967 | Emery et al. | 29—599 X |

JOHN F. CAMPBELL, *Primary Examiner.*

PAUL M. COHEN, *Assistant Examiner.*

U.S. Cl. X.R.

29—502, 504, 527, 528, 579; 75—134.3